United States Patent
Yoshida et al.

(10) Patent No.: US 10,576,711 B2
(45) Date of Patent: **\*Mar. 3, 2020**

(54) TRANSFER FILM

(71) Applicant: Dai Nippon Printing Co., Ltd., Tokyo (JP)

(72) Inventors: Kazuya Yoshida, Tokyo (JP); Hiroyuki Hasegawa, Tokyo (JP); Yoshihiro Imakura, Tokyo (JP); Ryoji Hattori, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 95 days.

This patent is subject to a terminal disclaimer.

(21) Appl. No.: 15/577,023

(22) PCT Filed: May 27, 2016

(86) PCT No.: PCT/JP2016/065787
§ 371 (c)(1),
(2) Date: Nov. 27, 2017

(87) PCT Pub. No.: WO2016/190427
PCT Pub. Date: Dec. 1, 2016

(65) Prior Publication Data
US 2018/0141307 A1    May 24, 2018

(30) Foreign Application Priority Data
May 28, 2015 (JP) .................... 2015-108515

(51) Int. Cl.
*B32B 7/06*    (2019.01)
*B32B 27/30*    (2006.01)
(Continued)

(52) U.S. Cl.
CPC .............. *B32B 7/06* (2013.01); *B32B 27/16* (2013.01); *B32B 27/30* (2013.01); *B32B 27/308* (2013.01);
(Continued)

(58) Field of Classification Search
CPC ........ B32B 27/308; B32B 27/40; B32B 27/16; B32B 2270/00; B32B 2250/24; C09D 133/00
See application file for complete search history.

(56) References Cited

U.S. PATENT DOCUMENTS

2005/0079341 A1 * 4/2005 Masuda .................... B32B 7/06
    428/323
2008/0152875 A1  6/2008 Tomita et al.
(Continued)

FOREIGN PATENT DOCUMENTS

JP    2001-071694 A1    3/2001
JP    2007-118466 A1    5/2007
(Continued)

OTHER PUBLICATIONS

Chinese Office Action (Application No. 201680027145.8) dated Mar. 18, 2019 (with English translation).
(Continued)

*Primary Examiner* — Betelhem Shewareged
(74) *Attorney, Agent, or Firm* — Burr & Brown, PLLC (57) ABSTRACT

An object is to provide a transfer film that can impart sufficient durability such as abrasion resistance and solvent resistance to a transfer object surface and has high transfer property without causing any transfer failures such as tailing and burr. The transfer film according to the present invention comprises a substrate and a protective layer peelably provided on the substrate, wherein the protective layer comprises an active ray-cured resin and a filler; wherein the
(Continued)

active ray-cured resin contains polyfunctional urethane (meth)acrylate as a polymerization component; and wherein the filler has a volume average particle size of 40 nm or less.

16 Claims, 3 Drawing Sheets

(51) Int. Cl.
  *B44C 1/17* (2006.01)
  *B32B 27/40* (2006.01)
  *C09D 133/00* (2006.01)
  *B32B 27/16* (2006.01)
  *B42D 25/23* (2014.01)

(52) U.S. Cl.
  CPC .............. *B32B 27/40* (2013.01); *B42D 25/23* (2014.10); *B44C 1/17* (2013.01); *C09D 133/00* (2013.01); *B32B 2250/24* (2013.01)

(56) References Cited

U.S. PATENT DOCUMENTS

| 2011/0262739 A1 | 10/2011 | Watase et al. |
| 2013/0209819 A1* | 8/2013 | Noda ................ B32B 27/308 428/522 |

FOREIGN PATENT DOCUMENTS

| JP | 2007-118467 A1 | 5/2007 | | |
| JP | 2007-118563 A1 | 5/2007 | | |
| JP | 2008-006708 A1 | 1/2008 | | |
| JP | 2008-009134 A1 | 1/2008 | | |
| JP | 2008-081728 A1 | 4/2008 | | |
| JP | 2013-082833 A1 | 5/2013 | | |
| JP | 2013-111942 A1 | 6/2013 | | |
| JP | 2013256105 A * | 12/2013 | ............. | B32B 27/00 |
| JP | 2014-069523 A1 | 4/2014 | | |
| JP | 2014-144625 A1 | 8/2014 | | |
| JP | 2014-198317 A1 | 10/2014 | | |
| TW | 200932521 A | 8/2009 | | |
| TW | 201441064 A | 11/2014 | | |
| WO | 2014/162956 A1 | 10/2014 | | |

OTHER PUBLICATIONS

Extended European Search Report (Application No. 16800131.1) dated Nov. 16, 2018.
International Search Report and Written Opinion (Application No. PCT/JP2016/065787) dated Aug. 23, 2016.
Japanese Office Action (Application No. 2016-106596) dated Feb. 14, 2017 (with English translation).
Japanese Decision to Grant a Patent (Application No. 2016-106596) dated Jun. 30, 2017 (with English translation).
English translation of International Preliminary Report on Patentability (Chapter I) (Application No. PCT/JP2016/065787) dated Dec. 7, 2017, 12 pages.
Taiwanese Office Action (Application No. 105116874) dated Mar. 27, 2019 (with English translation).

* cited by examiner

TRANSFER FILM

BACKGROUND OF THE INVENTION

Field of the Invention

The present invention relates to a transfer film, and more particularly to a transfer film having good transfer property and capable of imparting sufficient durability to the transfer object surface.

Background Art

ID cards such as identification paper and IC cards such as an ATM card, where individual information such as a face photo, an address, and a name is recorded, are subjected to security processing so that the contents of the information are not falsified and altered. For example, an IC card having a surface on which hologram is provided is widely distributed. Such an IC card has a surface on which a transfer layer including a protective layer is provided by using a transfer film, in order to protect the information recorded and the hologram.

A transfer film has a configuration where a transfer layer including a protective layer or the like, which can be transferred onto a substrate, is provided, and the transfer layer can be transferred onto the surface of a transfer object such as an IC card, to thereby impart durability such as solvent resistance and abrasion resistance to the transfer object surface. Such a transfer film is required to have high transfer property without occurrence of any transfer failures such as tailing and burr. For example, Japanese Laid-open Patent Application (Kokai) No. 2013-111942 (Patent Literature 1) discloses a thermal transfer film having a hard coat layer formed from an ink composition containing inorganic particles and a polyfunctional isocyanate. However, there has been room for improvement in transfer property and durability of a decorative molding or printed product, when the hard coat layer or the like is transferred from the thermal transfer film to a transfer object.

CITATION LIST

Patent Literature

Patent Literature 1: Japanese Laid-open Patent Application (Kokai) No. 2013-111942

SUMMARY OF THE INVENTION

Technical Problem

In view of such a situation, a main object of the present invention is to provide a transfer film which comprises a protective layer or the like with high transparency, is excellent in transfer property when the protective layer or the like is transferred to a transfer object, and can easily provide a good printed product with high durability and haze prevention.

Solution to Problem

The transfer film according to the present invention is a transfer film comprising a substrate and a protective layer peelably provided on the substrate, wherein
the protective layer comprises an active ray-cured resin and a filler;
the active ray-cured resin contains a polyfunctional urethane (meth)acrylate as a polymerization component; and
the filler has a volume average particle size of 40 nm or less.

In a preferred aspect of the present invention, an adhesive layer is further provided on the protective layer.

In a preferred aspect of the present invention, the adhesive layer has a function as a receptive layer.

In a preferred aspect of the present invention, a release layer is provided between the substrate and the protective layer.

In a preferred aspect of the present invention, the number of functional groups in the polyfunctional urethane (meth)acrylate is 5 or more and 15 or less.

In a preferred aspect of the present invention, the active ray-cured resin further contains urethane (meth)acrylate having a functional group number of 2 or more and 4 or less and/or (meth)acrylate having a functional group number of 2 or more and 5 or less as a polymerization component.

In a preferred aspect of the present invention, the adhesive layer contains silicone.

Advantageous Effect of Invention

The transfer film according to the present invention comprises a substrate and a protective layer comprising a active ray-cured resin and a filler; wherein the active ray-cured resin contains a polyfunctional urethane (meth)acrylate as a polymerization component; and wherein the filler has a volume average particle size of 40 nm or less, so that the transfer film can impart sufficient durability such as abrasion resistance and solvent resistance to a transfer object surface and enhance the transfer property of the transfer film. The protective layer and the like provided in the transfer film of the present invention have an excellent transparency, and thus can provide a good printed product with haze occurrence prevented thereby.

DETAILED DESCRIPTION OF THE INVENTION

Definition

As used herein, the terms "part(s)", "%", "ratio", and the like with respect to compounding are on a mass basis, unless particularly noted. The terms "PET" is an abbreviation, synonym, functional expression, trivial name, or jargon for "polyethylene terephthalate."

The term "active ray-curable resin" means a precursor or a composition before irradiation with active ray, and the active ray-curable resin subjected to curing by irradiation with active ray refers to an active ray-cured resin.

As used herein, the term "active ray" means any radiation that can chemically act on the active ray-curable resin to promote polymerization, and specifically means visible light, ultraviolet light, X-ray, electron beam, α-ray, β-ray, γ-ray, and the like.

Transfer Film

Figure 1:
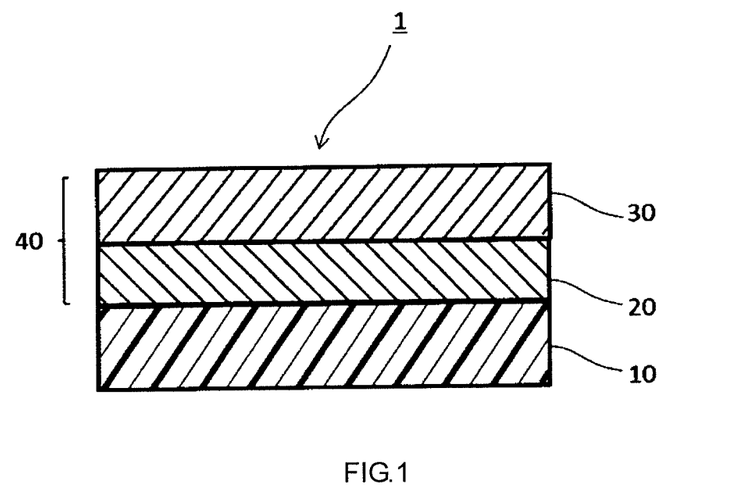
FIG. 1 is a schematic cross-sectional view of a transfer film according to one embodiment of the present invention.
Figure 2:
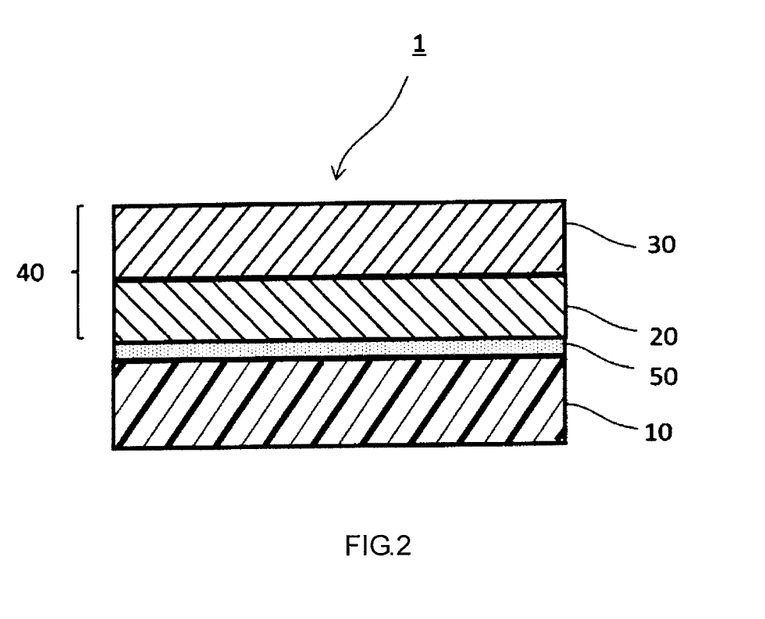
FIG. 2 is a schematic cross-sectional view of a transfer film according to one embodiment of the present invention.
Figure 3:
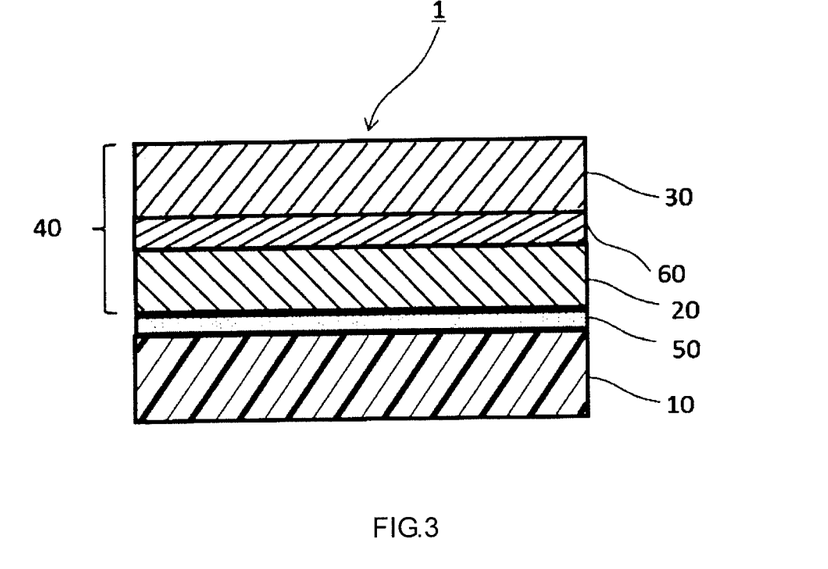
FIG. 3 is a schematic cross-sectional view of a transfer film according to one embodiment of the present invention.
Figure 4:
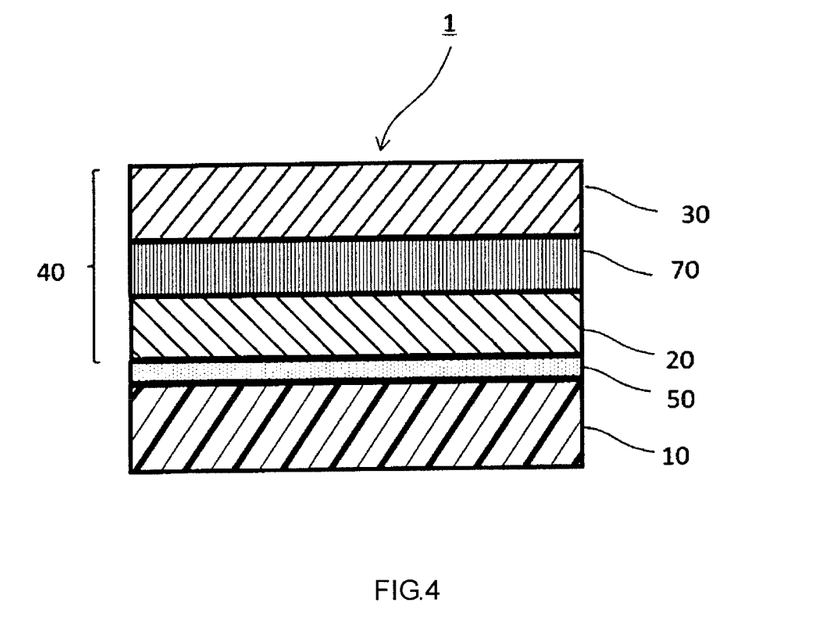
FIG. 4 is a schematic cross-sectional view of a transfer film according to one embodiment of the present invention.
Figure 5:
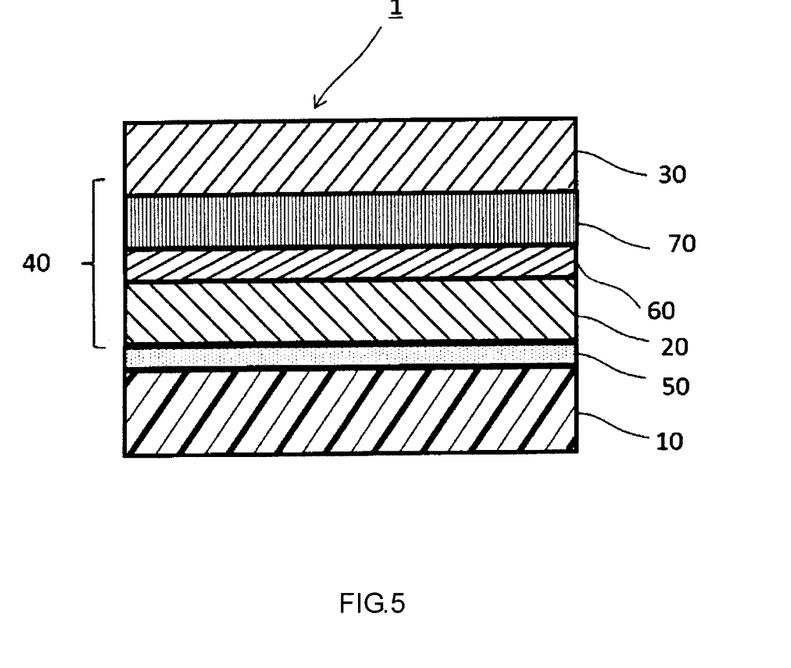
FIG. 5 is a schematic cross-sectional view of a transfer film according to one embodiment of the present invention.

Embodiments of the present invention are described in detail with reference to drawings. FIGS. 1 and 2 each illustrates a schematic cross-sectional view of a transfer film according to one embodiment of the present invention. The transfer film according to the present invention comprises a substrate 10 and a protective layer 20 peelably provided on the substrate 10 (see FIG. 1). When using such transfer film 1 to transfer the transfer layer 40 to a transfer object (not shown), the protective layer 20 is transferred to the transfer object as the transfer layer 40. An adhesive layer 30 may be provided on the protective layer 20 (see FIG. 1). A release layer 50 may be provided between the substrate 10 and the protective layer 20 so that the protective layer 20 is easily peeled off from the substrate 10 and the transfer layer 40 is transferred to the transfer object (see FIG. 2). A primer layer 60 may be provided between the protective layer 20 and adhesive layer 30 (see FIG. 3). In the transfer film, a receptive layer 70 may be provided between the protective layer 20 or the primer layer 60 and the adhesive layer 30 (see FIGS. 4 and 5). An anchor layer may be provided between the substrate 10 and the release layer 50 (not shown). As described below, the adhesive layer which is optionally provided, when the configuration thereof is adjusted, can also thus serve as a receptive layer.

Hereinafter, respective layers forming the transfer film according to the present invention will be described.

Substrate

Any substrate can be used as the substrate without particular limitation, as long as such any substrate has heat resistance so as to be able to withstand heat energy (for example, heat of a thermal head) in transfer of the transfer layer from the transfer film to the transfer object and has mechanical strength and solvent resistance so as to be able to support the transfer layer. Examples include polyester-based resins such as polyethylene terephthalate, polybutylene terephthalate, polyethylene naphthalate, a polyethylene terephthalate-isophthalate copolymer, a terephthalic acid-cyclohexanedimethanol-ethylene glycol copolymer and an co-extruded film of polyethylene terephthalate/polyethylene naphthalate; polyamide-based resins such as nylon 6 and nylon 66; polyolefin-based resins such as polyethylene, polypropylene and polymethylpentene; vinyl resins such as polyvinyl chloride; acrylic resins such as polyacrylate, polymethacrylate and polymethyl methacrylate; imide-based resins such as polyimide and polyetherimide; engineering resins such as polyarylate, polysulfone, polyether sulfone, polyphenylene ether, polyphenylene sulfide, polyaramid, polyether ketone, polyether nitrile, polyether ether ketone, polycarbonate and polyether sulfite; styrene-based resins such as polystyrene, high-impact polystyrene, an AS resin (acrylonitrile-styrene copolymer) and an ABS resin (acrylonitrile-butadiene-styrene copolymer); and cellulose-based resins such as cellophane, cellulose acetate and nitrocellulose.

The substrate may be a copolymer resin or a composite (including an alloy) mainly containing any resin(s) described above, or a laminate including a plurality of layers. While the substrate may be a stretched film or an unstretched film, a film uniaxially or biaxially stretched is preferably used for the purpose of an enhancement in strength. The substrate is used as a film, sheet, or board comprising at least one layer of these resins. Among substrates made of resins described above, a film of polyester such as polyethylene terephthalate or polyethylene naphthalate is suitably used because of being excellent in heat resistance and mechanical strength, and, in particular, a polyethylene terephthalate film is more preferable.

In addition, asperities can be, if necessary, imparted to the substrate surface in order to prevent blocking. Example of the procedure for forming such asperities on the substrate includes kneading of a matting agent, sandblast processing, hairline processing, matt coating, or chemical etching. When matt coating treatment is carried out, organic substances such as crosslinked acrylic resins and crosslinked styrene-based resins, and inorganic substances such as silicon dioxide, zinc oxide and titanium dioxide can be used.

A substrate having a thickness of 0.5 μm or more and 50 μm or less, more preferably 4 μm or more and 20 μm or less can be suitably used. Any thickness of the substrate within the above numerical range can provide high mechanical strength and transfer property.

Since a release layer can be provided on the surface of the substrate as described below, an easily adhesive treatment such as a corona discharge treatment, a plasma treatment, an ozone treatment, a frame treatment, an adhesive agent (also referred to as "anchor coat", "adhesion promoter" or "easy adhesive agent") coating treatment, a pre-heating treatment, a dust removal treatment, a vapor deposition treatment, an alkali treatment, or providing of an antistatic layer may be performed in advance on the surface on which the release layer is to be provided. Additive(s) such as a filler, a plasticizer, a colorant, and an antistatic agent may also be added to the substrate, if necessary.

Protective Layer

Next, the protective layer constituting the transfer layer will be described. The protective layer comprises an active ray-cured resin and a filler and serves to protect the transfer object surface.

The active ray-cured resin includes compositions obtained by appropriately mixing polymers, prepolymers, oligomers and/or monomers having in the molecule a polymerizable unsaturated bond such as (meth)acryloyl group or (meth)acryloyloxy group, or an epoxy group as polymerization components.

The active ray-cured resin forming the protective layer contains a polyfunctional urethane (meth)acrylate as a polymerization component. The protective layer contains a polyfunctional urethane (meth)acrylate, which can provide enhancement of the solvent resistance. The protective layer, which contains a polyfunctional urethane (meth)acrylate, can also enable the filler described later to be firmly held in the protective layer, thereby preventing the falling during storage, transfer or the like. The number of functional groups in the polyfunctional urethane (meth)acrylate is preferably 5 or more and 15 or less, more preferably 6 or more and 15 or less. Polyfunctional urethane (meth)acrylate is preferably contained in an amount of 5% by mass or more and 80% by mass or less, more preferably 10% by mass or more and 50% by mass or less, based on the total solid content of the protective layer. Examples of the functional group include groups having an unsaturated double bond such as vinyl group.

Urethane (meth)acrylates can be obtained by introducing (meth)acrylic acid into a urethane resin, such as ethylene glycol/adipic acid/tolylene diisocyanate/2-hydroxyethyl acrylate, polyethylene glycol/tolylene diisocyanate/2-hydroxyethyl acrylate, hydroxyethylphthalyl methacrylate/xylene diisocyanate, 1,2-polybutadiene glycol/tolylene diisocyanate/2-hydroxyethyl acrylate, and trimethylolpropane/ propylene glycol/tolylene diisocyanate/2-hydroxyethyl acrylate.

From the viewpoint of compatibility between solvent resistance and flexibility, urethane (meth)acrylate having a functional group number of about 2 or more and 4 or less and/or (meth)acrylate having a functional group number of 2 or more and 5 or less and urethane (meth)acrylate having many functional groups are preferably contained in combination. Urethane (meth)acrylate and (meth)acrylate having a functional group number of about 2 or more and 5 or less are preferably contained in a total amount of 5% by mass or more and 80% by mass or less, more preferably 10% by mass or more and 70% by mass or less, based on the total solid content of the protective layer.

Both the molecular weights of polyfunctional urethane (meth)acrylate and urethane (meth)acrylate having a functional group number of 2 or more and 4 or less is preferably in the range of 400 or more and 20000 or less, more preferably 500 or more and 10000 or less. When the molecular weight of urethane (meth) acrylate is within the above numerical range, the abrasion resistance can be enhanced. When the molecular weight is 20000 or less, good film cutting can be realized. For the same reason, the molecular weight of (meth)acrylate having a functional group number of 2 or more and 5 or less is preferably in the range of 200 or more and 5000 or less. As used herein, the "molecular weight" means a value measured by gel permeation chromatography with polystyrene as a standard substance, and can be measured by a method according to JIS-K-7252-1 (published in 2008).

The protective layer may contain an unsaturated bond-containing (meth)acrylate copolymer as a polymerization component. Examples of the unsaturated bond-containing (meth)acrylate copolymer include polyester (meth)acrylates obtained by introducing (meth)acrylic acid into a polyester obtained by bonding of polybasic acids such as adipic acid, trimellitic acid, maleic acid, phthalic acid, terephthalic acid, himic acid, malonic acid, succinic acid, itaconic acid, pyromellitic acid, fumaric acid, glutaric acid, pimelic acid, sebacic acid, dodecanoic acid, or tetrahydrophthalic acid to polyhydric alcohols such as ethylene glycol, propylene glycol, diethylene glycol, propylene oxide, 1,4-butanediol, triethylene glycol, tetraethylene glycol, polyethylene glycol, glycerol, trimethylolpropane, pentaerythritol, sorbitol, 1,6-hexanediol or 1,2,6-hexanetriol; and epoxy (meth)acrylates, melamine (meth)acrylates and triazine (meth)acrylates obtained by introducing (meth)acrylic acid into an epoxy resin, such as bisphenol A/epichlorohydrin/(meth)acrylic acid and phenol novolac/epichlorohydrin/(meth)acrylic acid.

The protective layer may contain, as a polymerization component, a prepolymer, oligomer and/or monomer as described below in addition to the unsaturated bond-containing acrylic copolymer.

Examples of the prepolymer include silicone resin acrylates such as polysiloxane (meth)acrylate and polysiloxane/diisocyanate/2-hydroxyethyl(meth)acrylate; and others such as alkyd-modified (meth)acrylates obtained by introducing (meth)acryloyl group into an oil-modified alkyd resin, and spirane resin acrylates.

Examples of the monomer or oligomer include acrylic ester compounds and methacrylic ester compounds having an ethylenic double bond, which are generally known as active ray-polymerizable monomer/oligomer. These compounds have at least a methacryloyl group or an acryloyl group. Examples include monofunctional acrylic acid esters such as 2-ethylhexyl acrylate, 2-hydroxypropyl acrylate, glycerol acrylate, tetrahydrofurfuryl acrylate, phenoxyethyl acrylate, nonylphenoxyethyl acrylate, tetrahydrofurfuryloxyethyl acrylate, tetrahydrofurfuryloxyhexanolide acrylate, acrylate of an ε-caprolactone adduct of 1,3-dioxane alcohol, and 1,3-dioxolan acrylate, or methacrylic acid, itaconic acid, crotonic acid, and maleic acid esters obtained by replacing these acrylates with methacrylates, itaconates, crotonates, and maleates; difunctional acrylic acid esters such as ethylene glycoldiacrylate, triethylene glycol diacrylate, pentaerythritol diacrylate, hydroquinone diacrylate, resorcin diacrylate, hexanediol diacrylate, neopentyl glycol diacrylate, tripropylene glycol diacrylate, diacrylate of hydroxypivalic acid neopentyl glycol, diacrylate of neopentyl glycol adipate, diacrylate of an ε-caprolactone adduct of hydroxypivalic acid neopentyl glycol, 2-(2-hydroxy-1,1-dimethylethyl)-5-hydroxymethyl-5-ethyl-1,3-d ioxane diacrylate, tricyclodecanedimethylol acrylate, an ε-caprolactone adduct of tricyclodecanedimethylol acrylate, and diacrylate of diglycidyl ether of 1,6-hexanediol, or methacrylic acid, itaconic acid, crotonic acid, and maleic acid esters obtained by replacing these acrylates with methacrylates, itaconates, crotonates, and maleates; multifunctional acrylic acid esters such as trimethylolpropane triacrylate, ditrimethylolpropane tetraacrylate, trimethylolethane triacrylate, pentaerythritol triacrylate, pentaerythritol tetraacrylate, dipentaerythritol tetraacrylate, dipentaerythritol pentaacrylate, dipentaerythritol hexaacrylate, an ε-caprolactone adduct of dipentaerythritol hexaacrylate, pyrogallol triacrylate, propionic acid/dipentaerythritol triacrylate, propionic acid/dipentaerythritol tetraacrylate, and hydroxypivalaldehyde-modified dimethylolpropane triacrylate, or methacrylic acid, itaconic acid, crotonic acid, and maleic acid esters obtained by replacing these acrylates with methacrylates, itaconates, crotonates, and maleates; a phosphazene monomer, triethylene glycol, isocyanuric acid ethylene oxide-modified diacrylate, isocyanuric acid ethylene oxide-modified triacrylate, dimethylol tricyclodecane diacrylate, trimethylolpropane acrylic acid benzoic acid ester, alkylene glycol type acrylic-modified acrylates and modified urethane acrylates whose functional group number is not limited to the above-mentioned number.

The protective layer contains a filler. Examples of the filler include an organic filler, an inorganic filler, and an organic-inorganic hybrid filler. The filler may be a powder or a sol. Among the above fillers, an inorganic particle is preferable because it has high hardness and thereby can improve scratch resistance.

The volume average particle size of the filler contained in the protective layer is 40 nm or less. More preferably, the volume average particle size is 30 μm or less. The volume average particle size of the filler can be 40 nm or less, thereby allowing transparency of the protective layer to be maintained. The volume average particle size of the filler is preferably 10 nm or more. The volume average particle size of the filler can be 10 nm or more, thereby allowing dispersibility to be maintained and also preventing stability of a protective layer coating liquid from being decreased. The volume average particle size can be determined by a method using a measuring apparatus using a laser dynamic light scattering method or a TEM, or a BET method (A method in which molecules having a known adsorption occupation area are adsorbed on the surface of powder particles at the temperature of liquid nitrogen to determine the specific surface area of the sample from that amount). For example, the volume average particle size can be measured with a particle size/particle diameter distribution analyzer (for example, Nanotrac particle size distribution analyzer manufactured by NIKKISO CO., LTD.) or a surface area/pore size distribution analyzer (for example, manufactured by SHIMADZU CORPORATION) according to JIS-Z-8819-2 (published in 2001).

Examples of the inorganic particle include metal oxide particles such as a silica particle (colloidal silica, fumed silica, precipitated silica, and the like), an alumina particle, a zirconia particle, a titania particle, and a zinc oxide particle, and a silica particle is preferably used from the viewpoint of enhancing wear resistance. Furthermore, the inorganic particle is preferably subjected to a surface treatment with a silane coupling agent such as γ-aminopropyltriethoxysilane or γ-methacryloxypropyltrimethohxysilane.

The filler is preferably contained in a proportion of 5% by mass or more and 60% by mass or less, more preferably 10% by mass or more and 50% by mass or less, based on the total solid content of the protective layer. When the content of the filler is within the above numerical range, it is possible to enhance transfer property of the transfer film and abrasion resistance of a printed product obtained by using the transfer film, and also to prevent occurrence of defects such as cracks due to the protective layer being brittle.

The thickness of the protective layer is preferably 1 μm or more and 20 μm or less, more preferably 1 μm or more and 8 μm or less. When the thickness of the protective layer is within the above numerical range, it is possible to impart high durability while preventing transfer failure.

The protective layer can be formed by coating a substrate or a release layer described later with a coating liquid containing an active ray-curable resin and a filler by a known procedure such as roll coating, reverse roll coating, gravure coating, reverse gravure coating, bar coating, or rod coating to form a coating film, and then crosslinking and curing the polymerization component such as the above-mentioned polymerizable copolymer by active ray. For example, ultraviolet irradiation can be carried out using a conventionally known ultraviolet irradiation apparatus, and any of various apparatuses such as a high-pressure mercury lamp, a low-pressure mercury lamp, a carbon-arc lamp, a xenon arc lamp, a metal halide lamp, an electrodeless ultraviolet lamp, or an LED can be used without limitation. Electron beam irradiation may be carried out by using either a high-energy electron beam irradiation apparatus that radiates electron beam at an energy of 100 keV or more and 300 keV or less or a low-energy electron beam irradiation apparatus that radiates electron beam at an energy of 100 keV or less, and an irradiation system may be either a scanning irradiation system or a curtain type irradiation system.

Adhesive Layer

Next, the adhesive layer which is optionally provided in the transfer film according to the present invention will be described.

The adhesive layer is provided so as to be positioned on the surface of the transfer film, and improves the adhesion between the transfer layer and the transfer object. The adhesive layer may also serve as a receptive layer on which an image is to be formed by thermal transfer from a thermal transfer sheet having a color material layer according to a thermal transfer method. The transfer layer of the transfer film, on which the image is formed, is then transferred to the transfer object, resulting in formation of a printed product.

Examples of the material for forming the adhesive layer include a thermal adhesion-type adhesive agent which is molten or softened by heat and thus bonded, and specific examples include an ionomer resin, an acid-modified polyolefin-based resin, an ethylene-(meth)acrylic acid copolymer, an ethylene-(meth)acrylic acid ester copolymer, a polyester-based resin, a polyamide-based resin, a vinyl resin, an acryl/methacryl-based (meth)acrylic resin, an acrylic acid ester-based resin, a maleic acid resin, a butyral-based resin, an alkyd resin, a polyethylene oxide resin, a phenol-based resin, a urea resin, a melamine resin, a melamine-alkyd resin, a cellulose-based resin, a polyurethane-based resin, a polyvinyl ether resin, a silicone resin, and a rubber-based resin. These resins may be used singly or in combination of a plurality of them. Among them, a vinyl resin, an acrylic resin, a butyral-based resin, and a polyester-based resin are preferable in terms of an adhesion force. A vinyl resin, an acrylic resin, an ethylene-(meth)ethyl acrylate copolymer and an acrylic ester copolymer are more preferable.

In the case where the adhesive layer serves as a receptive layer, a conventionally known resin which easily receives a heat-transferable color material such as a sublimation dye or a thermal fusible ink is preferably used. Examples of the resin material include a polyolefin-based resin such as polypropylene, a halogenated resin such as polyvinyl chloride or polyvinylidene chloride, a vinyl resin such as polyvinyl acetate, a vinyl chloride-vinyl acetate-based polymer, an ethylene-vinyl acetate copolymer or a polyacrylic acid ester, a polyester resin such as polyethylene terephthalate or polybutylene terephthalate, a polystyrene-based resin, a polyamide-based resin, a copolymer-based resin made of olefin such as ethylene or propylene with other vinyl polymer, an ionomer, a cellulose-based resin such as cellulose diastase, and polycarbonate. Among them, a vinyl chloride-vinyl acetate-based polymer or polyvinyl chloride resin is preferable, and a vinyl chloride-vinyl acetate-based polymer is particularly preferable.

The content of the resin in the adhesive layer is preferably 30% by mass or more and 100% by mass or less, more preferably 50% by mass or more and 100% by mass or less, based on the total solid content of the adhesive layer. When the content of the resin in the adhesive layer is within the above numerical range, it is possible to enhance the transfer property to the transfer object and also enhance the receptivity to a heat-transferable color material such as a sublimation dye or thermal fusible ink.

The adhesive layer preferably contains silicone. As used herein, silicone includes a modified silicone resin and a modified silicone oil. Examples of the modified silicone resin include an epoxy-modified silicone resin, a monoamine-modified silicone resin, a diamine-modified silicone resin, and a mercapto-modified silicone resin. Examples of the modified silicone oil include an epoxy-modified silicone oil, a monoamine-modified silicone oil, a diamine-modified silicone oil, and a mercapto-modified silicone oil. When the adhesive layer contains silicone, releasability from the thermal transfer sheet having the color material layer can be enhanced.

The content of silicone in the adhesive layer is preferably 0.1% by mass or more and 30% by mass or less, more preferably 1% by mass or more and 20% by mass or less, based on the total solid content of the adhesive layer. When the content of silicone in the adhesive layer is within the above numerical range, releasability from the thermal transfer sheet having the color material layer and transfer property to the transfer object can be compatible.

Usually, the thickness of the adhesive layer is preferably in the range of 0.1 μm or more and 10 μm or less, and more preferably in the range of 0.3 μm or more and 3 μm or less.

The adhesive layer can be formed by dissolving or dispersing single or multiple materials selected from the above materials and various additives added as necessary in a proper solvent such as water or an organic solvent to prepare a coating liquid for the adhesive layer, applying the coating liquid by a method such as a gravure printing method, a screen printing method, or a reverse coating method using a gravure plate, and drying it.

Release Layer

Next, the release layer which is optionally provided in the transfer film according to the present invention will be described.

The release layer, which is provided on the substrate, is a layer that allows the transfer layer provided thereon to be peeled from the transfer film and to be transferred to the transfer object. In peeling of the transfer layer from the transfer film, the release layer remains on the substrate.

Examples of the resin for use in the release layer include melamine-based resin, silicone, fluororesin, cellulose-based resin, urea-based resin, polyolefin-based resin, acrylic resin and cellulosic resin. Among them, melamine-based resin is preferable because of being capable of imparting a proper adhesion force of the transfer layer and the substrate to the transfer film.

Usually, the thickness of the release layer is preferably in the range of 0.1 µm or more and 5 µm or less, and more preferably in the range of 0.5 µm or more and 2 µm or less.

The release layer can be formed by dissolving or dispersing the above resin in a solvent, coating the substrate with the resulting coating liquid by a known coating method such as roll coating or gravure coating and drying it, and baking it at a temperature of about 100° C. or more and 200° C. or less.

Primer Layer

Next, the primer layer which is optionally provided in the transfer film according to the present invention will be described.

The primer layer is provided on the protective layer. The primer layer preferably contains a thermoplastic resin and an isocyanate compound. Examples of the thermoplastic resin include polyester resin, polyurethane resin, acrylic resin, polycarbonate resin, polyvinylalcohol resin, vinyl chloride-vinyl acetate copolymer and polyvinyl butyral resin. Among them, polyester resin and vinyl chloride-vinyl acetate copolymer are preferred, and more preferred is a combination of polyester resin and vinyl chloride-vinyl acetate copolymer. When the combination of polyester resin and vinyl chloride-vinyl acetate copolymer is used, the compounding ratio thereof (polyester resin/vinyl chloride-vinyl acetate copolymer) is preferably 1/40 or more and 30 or less, more preferably 1/30 or more and 20 or less, still more preferably 1/25 or more and 15 or less, most preferably 1/2 or more and 6 or less, on a mass basis. The content of the thermoplastic resin in the primer layer is preferably 50% by mass or more and 90% by mass or less, more preferably 60% by mass or more and 90% by mass or less, based on the total solid content of the primer layer. When the content of the thermoplastic resin is within the above numerical range, the adhesion to the transfer object or the adhesive layer can be further enhanced.

As the isocyanate compound, a polyisocyanate compound having two or more isocyanate groups in the molecule is preferable. Examples of the polyisocyanate compound include xylene diisocyanate, p-phenylene diisocyanate, 1-chloro-2,4-phenyl diisocyanate, 2-chloro-1,4-phenyl diisocyanate, 2,4-toluene diisocyanate, 2,6-toluene diisocyanate, 1,5-naphthalene diisocyanate, tolidine diisocyanate, p-phenylene diisocyanate, trans-cyclohexane, 1,4-diisocyanate, hexamethylene diisocyanate, 4,4'-biphenylene diisocyanate, triphenylmethane triisocyanate and 4,4',4"-trimethyl-3,3',2'-triisocyanate-2,4,6-triphenylcyanurate. The content of the isocyanate compound in the primer layer is preferably 10% by mass or more and 50% by mass or less, more preferably 10% by mass or more and 40% by mass or less, based on the total solid content of the primer layer. When the content of the isocyanate compound is within the above numerical range, the adhesion to the adhesive layer or the receptive layer can be further enhanced.

Usually, the thickness of the primer layer is preferably in the range of 0.05 µm or more and 3 µm or less, and more preferably in the range of 0.5 µm or more and 1.5 µm or less.

In addition to the thermoplastic resin and the isocyanate compound, the primer layer may contain, for example, microsilica or polyethylene wax.

Receptive Layer

Next, the receptive layer which is optionally provided in the transfer film according to the present invention will be described.

While the adhesive layer which is optionally provided in the transfer film of the present invention is adjusted in terms of the configuration thereof to thereby play a role as the receptive layer as described above, the transfer film may include a receptive layer. In this case, such a receptive layer is provided on the protective layer or primer layer, and an image is formed on the receptive layer, by thermal transfer from a thermal transfer sheet having a color material layer according to a thermal transfer method. The transfer layer of the transfer film, on which the image is formed, is then transferred to the transfer object, resulting in formation of a printed product. An adhesive layer is optionally provided on the receptive layer.

As a material for forming the receptive layer, a conventionally known resin material which can easily receive a heat-transferable color material such as a sublimation dye or a thermal fusible ink can be used. Examples of the resin material include a polyolefin-based resin such as polypropylene, a halogenated resin such as polyvinyl chloride or polyvinylidene chloride, a vinyl resin such as polyvinyl acetate, a vinyl chloride-vinyl acetate-based polymer, an ethylene-vinyl acetate copolymer or a polyacrylic acid ester, a polyester resin such as polyethylene terephthalate or polybutylene terephthalate, a polystyrene-based resin, a polyamide-based resin, a copolymer-based resin made of olefin such as ethylene or propylene with other vinyl polymer, an ionomer, a cellulose-based resin such as cellulose diastase, and polycarbonate. Among them, a vinyl chloride-vinyl acetate-based polymer or polyvinyl chloride resin is preferable, and a vinyl chloride-vinyl acetate-based polymer is particularly preferable.

Usually, the thickness of the receptive layer is preferably in the range of 0.5 µm or more and 10 µm or less, and more preferably in the range of 1 µm or more and 3 µm or less.

The receptive layer can be formed by dissolving or dispersing single or multiple materials selected from the above materials and various additives added as necessary in a proper solvent such as water or an organic solvent to prepare a coating liquid for the receptive layer, applying the coating liquid by a method such as a gravure printing method, a screen printing method, or a reverse coating method using a gravure plate, and drying it.

Transfer of Transfer Layer

The method for transfer the transfer layer on the transfer object by using the transfer film according to the present invention may be a known transfer method, and for example, a known method such as hot stamping (embossing) by heat stamp, whole surface or stripe transfer by a heat roll, or a thermal printer (also referred to as "thermal transfer printer") by a thermal head (heat-sensitive printing head) can be applied. Hot stamping is preferable.

The transfer object is not particularly limited as long as it is used in any application where durability such as abrasion resistance or solvent resistance is required, and for example, either natural fibrous paper, coated paper, tracing paper, plastic film which does not deform by heat during transfer, glass, metal, ceramics, wood, cloth, or medium having dye receptivity may be used. An IC card and the like are usually needed to have designability and security. In the case where the transfer film according to the present invention includes no receptive layer, a printing layer, a hologram layer or the like is generally provided on a surface of the transfer object, on which the transfer layer is to be transferred.

EXAMPLES

Hereinafter, the present invention will be described in more detail with reference to Examples, but the present invention is not intended to be limited to these Examples.

Example 1

A film obtained by coating one surface of a polyethylene terephthalate (PET) film having a thickness of 12 μm with a release layer comprising melamine-based resin was used as a substrate, and the release layer was coated with a protective layer coating liquid having the following composition by gravure coating so that the thickness after drying was 6 μm, and the resultant was dried and thereafter irradiated with ultraviolet light by using an UV exposure device (Fusion UV, F600V, LH10 lamp, H valve, reflecting mirror: cold type), thereby forming a protective layer.
Protective Layer Coating Liquid Composition A
  Trifunctional acrylate 20 parts (produced by Shin-Nakamura Chemical Co., Ltd., trade name: NK ester A-9300)
  Difunctional urethane acrylate 20 parts (molecular weight: 1100, produced by Shin-Nakamura Chemical Co., Ltd., trade name: NK oligomer UA122-P)
  Pentadecafunctional urethane acrylate 10 parts (molecular weight: 2300, produced by Shin-Nakamura Chemical Co., Ltd., trade name: NK ester U-15HA)
  Unsaturated bond-containing acrylic copolymer 5 parts (produced by Shin-Nakamura Chemical Co., Ltd., trade name: NK ESTER C24T)
  Photopolymerization initiator 5 parts (produced by Ciba Specialty Chemicals Co., Ltd., trade name: Irgacure 907)
  Filler (silica) 40 parts (volume average particle size: 12 nm, produced by NISSAN CHEMICAL INDUSTRIES LTD., trade name: MEK-AC2140Z)
  Toluene 200 parts
  MEK (methyl ethyl ketone) 200 parts Next, the protective layer formed as described above was coated with an adhesive layer coating liquid by gravure coating so that the thickness after drying was 2 μm, and the resultant was dried to form an adhesive layer, thereby obtaining a transfer film. Herein, the adhesive layer in the present Example also serves as a receptive layer.
Adhesive Layer Coating Liquid Composition A
  Vinyl chloride-vinyl acetate copolymer 95 parts (produced by Nissin Chemical Co., Ltd., trade name: SOLBIN CNL)
  Epoxy-modified silicone oil 5 parts (produced by Shin-Etsu Chemical Co., Ltd., trade name: KP-1800U)
  Toluene 200 parts
  MEK 200 parts Example 2

A transfer film was produced in the same manner as in Example 1 except that the composition of the protective layer coating liquid was changed as follows.
Protective Layer Coating Liquid Composition B
  Trifunctional acrylate 20 parts (produced by Shin-Nakamura Chemical Co., Ltd., trade name: NK ESTER A-9300)
  Difunctional urethane acrylate 20 parts (molecular weight: 1100, produced by Shin-Nakamura Chemical Co., Ltd., trade name: NK oligomer UA122-P)
  Pentadecafunctional urethane acrylate 10 parts (molecular weight: 2300, produced by Shin-Nakamura Chemical Co., Ltd., trade name: NK ester U-15HA)
  Unsaturated bond-containing acrylic copolymer 5 parts (produced by Shin-Nakamura Chemical Co., Ltd., trade name: NK ESTER C24T)
  Photopolymerization initiator 5 parts (produced by Ciba Specialty Chemicals Co., Ltd., trade name: Irgacure 907)
  Filler (silica) 40 parts (volume average particle size: 25 nm, produced by BYK CO. LTD., trade name: NANOBYK-3605)
  Toluene 200 parts
  MEK 200 parts Example 3

A transfer film was produced in the same manner as in Example 1 except that the composition of the protective layer coating liquid was changed as follows.
Protective Layer Coating Liquid Composition C
  Trifunctional acrylate 20 parts (produced by Shin-Nakamura Chemical Co., Ltd., trade name: NK ESTER A-9300)
  Difunctional urethane acrylate 20 parts (molecular weight: 1100, produced by Shin-Nakamura Chemical Co., Ltd., trade name: NK oligomer UA122-P)
  Pentadecafunctional urethane acrylate 10 parts (molecular weight: 2300, produced by Shin-Nakamura Chemical Co., Ltd., trade name: NK ESTER U-15HA)
  Unsaturated bond-containing acrylic copolymer 5 parts (produced by Shin-Nakamura Chemical Co., Ltd., trade name: NK ESTER C24T)
  Photopolymerization initiator 5 parts (produced by Ciba Specialty Chemicals Co., Ltd., trade name: Irgacure 907)
  Filler (silica) 40 parts (volume average particle size: 20 nm, produced by BYK CO. LTD., trade name: NANOBYK-3650)
  Toluene 200 parts
  MEK 200 parts Example 4

A transfer film was produced in the same manner as in Example 1 except that the composition of the protective layer coating liquid was changed as follows.
Protective Layer Coating Liquid Composition D
  Trifunctional acrylate 27 parts (produced by Shin-Nakamura Chemical Co., Ltd., trade name: NK ESTER A-9300)
  Difunctional urethane acrylate 27 parts (molecular weight: 1100, produced by Shin-Nakamura Chemical Co., Ltd., trade name: NK oligomer UA122-P)
  Pentadecafunctional urethane acrylate 14 parts (molecular weight: 2300, produced by Shin-Nakamura Chemical Co., Ltd., trade name: NK ESTER U-15HA)
  Unsaturated bond-containing acrylic copolymer 7 parts (produced by Shin-Nakamura Chemical Co., Ltd., trade name: NK ESTER C24T)
  Photopolymerization initiator 5 parts (produced by Ciba Specialty Chemicals Co., Ltd., trade name: Irgacure 907)
  Filler (silica) 20 parts (volume average particle size: 12 nm, produced by NISSAN CHEMICAL INDUSTRIES LTD., trade name: MEK-AC2140Z)

Toluene 200 parts
MEK 200 parts

Example 5

A transfer film was produced in the same manner as in Example 1 except that the composition of the protective layer coating liquid was changed as follows.
Protective Layer Coating Liquid Composition E
  Trifunctional acrylate 32 parts (produced by Shin-Nakamura Chemical Co., Ltd., trade name: NK ESTER A-9300)
  Difunctional urethane acrylate 32 parts (molecular weight: 1100, produced by Shin-Nakamura Chemical Co., Ltd., trade name: NK oligomer UA122-P)
  Pentadecafunctional urethane acrylate 17 parts (molecular weight: 2300, produced by Shin-Nakamura Chemical Co., Ltd., trade name: NK ESTER U-15HA)
  Unsaturated bond-containing acrylic copolymer 9 parts (produced by Shin-Nakamura Chemical Co., Ltd., trade name: NK ESTER C24T)
  Photopolymerization initiator 5 parts (produced by Ciba Specialty Chemicals Co., Ltd., trade name: Irgacure 907)
  Filler (silica) 5 parts (volume average particle size: 12 nm, produced by NISSAN CHEMICAL INDUSTRIES LTD., trade name: MEK-AC2140Z)
  Toluene 200 parts
  MEK 200 parts Example 6

A transfer film was produced in the same manner as in Example 1 except that the composition of the protective layer coating liquid was changed as follows.
Protective Layer Coating Liquid Composition F
  Trifunctional acrylate 13.2 parts (produced by Shin-Nakamura Chemical Co., Ltd., trade name: NK ESTER A-9300)
  Difunctional urethane acrylate 13.2 parts (molecular weight: 1100, produced by Shin-Nakamura Chemical Co., Ltd., trade name: NK oligomer UA122-P)
  Pentadecafunctional urethane acrylate 7.2 parts (molecular weight: 2300, produced by Shin-Nakamura Chemical Co., Ltd., trade name: NK ESTER U-15HA)
  Unsaturated bond-containing acrylic copolymer 3.2 parts (produced by Shin-Nakamura Chemical Co., Ltd., trade name: NK ESTER C24T)
  Photopolymerization initiator 3.2 parts (produced by Ciba Specialty Chemicals Co., Ltd., trade name: Irgacure 907)
  Filler (silica) 60 parts (volume average particle size: 12 nm, produced by NISSAN CHEMICAL INDUSTRIES LTD., trade name: MEK-AC2140Z)
  Toluene 200 parts
  MEK 200 parts Example 7

A transfer film was produced in the same manner as in Example 1 except that the composition of the adhesive layer coating liquid was changed as follows.
Adhesive Layer Coating Liquid Composition A
  Vinyl chloride-vinyl acetate copolymer 100 parts (produced by Nissin Chemical Co., Ltd., trade name: SOLBIN CNL)
  Toluene 200 parts
  MEK 200 parts Example 8

A transfer film was obtained in the same manner as in Example 1 except that: the protective layer coating liquid shown in Example 1 was used to form a protective layer; then a primer layer coating liquid having the following composition was applied thereon by gravure coating so that the thickness after drying was 1 µm and dried to form a primer layer; and further the adhesive layer coating liquid shown in Example 1 was used in the same manner to form an adhesive layer on the primer layer.
Primer Layer Coating Liquid Composition
  Polyester resin 3.3 parts (produced by TOYOBO Co., Ltd., trade name: VYLON 200)
  Vinyl chloride-vinyl acetate copolymer 2.7 parts (produced by Nissin Chemical Co., Ltd., trade name: SOLBIN CNL)
  Isocyanate curing agent 1.5 parts (produced by The Ink-Tech Co., Ltd., trade name: XEL curing agent)
  Toluene 3.3 parts
  MEK 6.7 parts Example 9

A transfer film was produced in the same manner as in Example 4 except that a primer layer was provided between the protective layer and the adhesive layer in the same manner as in Example 8.

Comparative Example 1

A transfer film was produced in the same manner as in Example 1 except that the composition of the protective layer coating liquid was changed as follows.
Protective Layer Coating Liquid Composition G
  Trifunctional acrylate 20 parts (produced by Shin-Nakamura Chemical Co., Ltd., trade name: NK ESTER A-9300)
  Difunctional urethane acrylate 20 parts (molecular weight: 1100, produced by Shin-Nakamura Chemical Co., Ltd., trade name: NK oligomer UA122-P)
  Pentadecafunctional urethane acrylate 10 parts (molecular weight: 2300, produced by Shin-Nakamura Chemical Co., Ltd., trade name: NK ESTER U-15HA)
  Unsaturated bond-containing acrylic copolymer 5 parts (produced by Shin-Nakamura Chemical Co., Ltd., trade name: NK ESTER C24T)
  Photopolymerization initiator 5 parts (produced by Ciba Specialty Chemicals Co., Ltd., trade name: Irgacure 907)
  Toluene 200 parts
  MEK 200 parts Comparative Example 2

A transfer film was produced in the same manner as in Example 1 except that the composition of the protective layer coating liquid was changed as follows.
Protective Layer Coating Liquid Composition H
  Acrylic resin 60 parts (manufactured by Mitsubishi Rayon Co., Ltd., trade name: BR-87)
  Filler (silica) 40 parts (volume average particle size: 12 nm, produced by NISSAN CHEMICAL INDUSTRIES LTD., trade name: MEK-AC2140Z)
  Toluene 200 parts
  MEK 200 parts Comparative Example 3

A transfer film was produced in the same manner as in Example 1 except that the composition of the protective layer coating liquid was changed as follows.

Protective Layer Coating Liquid Composition I

Trifunctional acrylate 20 parts (produced by Shin-Nakamura Chemical Co., Ltd., trade name: NK ESTER A-9300)

Difunctional urethane acrylate 20 parts (molecular weight: 1100, produced by Shin-Nakamura Chemical Co., Ltd., trade name: NK oligomer UA122-P)

Pentadecafunctional urethane acrylate 10 parts (molecular weight: 2300, produced by Shin-Nakamura Chemical Co., Ltd., trade name: NK ESTER U-15HA)

Unsaturated bond-containing acrylic copolymer 5 parts (produced by Shin-Nakamura Chemical Co., Ltd., trade name: NK ESTER C24T)

Photopolymerization initiator 5 parts (produced by Ciba Specialty Chemicals Co., Ltd., trade name: Irgacure 907)

Filler (ZnO) 40 parts (volume average particle size: 100 nm, produced by Sakai Chemical Industry Co., Ltd.)

Toluene 200 parts

MEK 200 parts

Comparative Example 4

A transfer film was produced in the same manner as in Example 1 except that the composition of the protective layer coating liquid was changed as follows.

Protective Layer Coating Liquid Composition J

Trifunctional acrylate 20 parts (produced by Shin-Nakamura Chemical Co., Ltd., trade name: NK ESTER A-9300)

Difunctional urethane acrylate 20 parts (molecular weight: 1100, produced by Shin-Nakamura Chemical Co., Ltd., trade name: NK oligomer UA122-P)

Pentadecafunctional urethane acrylate 10 parts (molecular weight: 2300, produced by Shin-Nakamura Chemical Co., Ltd., trade name: NK ESTER U-15HA)

Unsaturated bond-containing acrylic copolymer 5 parts (produced by Shin-Nakamura Chemical Co., Ltd., trade name: NK ESTER C24T)

Photopolymerization initiator 5 parts (produced by Ciba Specialty Chemicals Co., Ltd., trade name: Irgacure 907)

Filler (silica) 40 parts (volume average particle size: 44 nm, reactive colloidal silica particle, produced by NISSAN CHEMICAL INDUSTRIES LTD., trade name: MIBK-SD-L)

Toluene 200 parts

MEK 200 parts

Evaluation of Transfer Film

A card substrate having the following material composition was used as a transfer object.

Composition of Card Substrate

Polyvinyl chloride compound (degree of polymerization: 800)

100 parts (containing 10% of additive such as stabilizer)

White pigment (titanium oxide) 10 parts

Plasticizer (dioctyl phthalate) 0.5 parts

Using an HDP-600 printer (manufactured by HID Global Co., Ltd.), an ink ribbon for HDP-600 with yellow, magenta and cyan dye layers was overlaid on the adhesive layers of the transfer sheets in Examples 1 to 9 and Comparative Examples 1 to 4, and images were formed by the heat of the thermal head according to the image information. The transfer layers were then transferred onto the above card substrates to form printed products 1 to 13.

An ink ribbon for HDP-600 with yellow, magenta and cyan dye layers was overlaid on the card substrates, and images were formed by the heat of the thermal head according to the image information. Next, the transfer layers were transferred onto the cards with a heat roller to form printed products 1' to 13'.

Film Tearing Test

Under the above transfer conditions, ten consecutive sheets were transferred, and then the appearance characteristics of the cards were visually evaluated. Evaluation criteria were as follows. The evaluation results were as shown in Tables 1 and 2 below.

A: Tailing is 0.3 mm or less.

B: Tailing is more than 0.3 mm and 0.5 mm or less.

C: Tailing is over 0.5 mm.

Surface Strength Test

The abrasion resistance test (Taber test) of the transfer layer on the card surface was carried out for 1500 cycles according to ANSI-INCITS 322-2002, 5.9 Surface Abrasion. Every 250 cycles, the state of the surface was visually observed and an evaluation test was carried out according to the following evaluation criteria (abrasive wheel: CS-10F, load: 500 gf). The abrasive wheel was polished every 250 cycles. The evaluation results were as shown in Tables 1 and 2.

A: The image after 1500 cycles was good.

B: The image after 1000 cycles was good, but was not good after 1500 cycles.

C: The image after 500 cycles was not good.

Solvent Resistance Test

A cotton swab soaked in methyl ethyl ketone (MEK) was reciprocated 30 times on the printed products 1 to 13' formed by using the transfer sheets in the examples and the comparative examples. The state of the image was visually confirmed to evaluate the solvent resistance based on the following evaluation criteria. The evaluation results were as shown in Tables 1 and 2.

A: No damage on the image.

B: Slight damage on the image at a level which does not become a problem in use.

C: Some damage on the image which becomes a problem in use.

Cracking Property Test

The center of each of the printed products 1 to 13' formed by using the transfer sheets in the examples and the comparative examples was pressed by hand, and both ends of the printed product were bent by 10 mm upward, and the state of the printed product after bending was visually confirmed to evaluate the cracking property based on the following evaluation criteria. The evaluation results were as shown in Tables 1 and 2.

A: No damage, or slight damage on the image at a level which does not become a problem in use.

B: Some damage on the image at a level which becomes a problem in use.

C: Heavy damage on the image which becomes a problem in use.

Transparency Test

For the printed products 1 to 13' formed by using the transfer sheets in the examples and the comparative examples, the transparency was evaluated via visual confirmation based on the following evaluation criteria. The evaluation results were as shown in Tables 1 and 2.

A: Almost no haze, or slight haze on the image at a level which does not become a problem in use.

B: Some haze on the image at a level which becomes a problem in use.

C: Heavy haze on the image which becomes a problem in use.

TABLE 1

|  | Film tearing test | Surface strength test | Solvent resistance test | Cracking property test | Transparency test |
|---|---|---|---|---|---|
| Example 1 (printed product 1) | A | A | A | A | A |
| Example 2 (printed product 1) | A | A | A | A | A |
| Example 3 (printed product 3) | A | A | A | A | A |
| Example 4 (printed product 4) | A | A | A | A | A |
| Example 5 (printed product 5) | B | B | A | A | A |
| Example 6 (printed product 6) | A | A | A | A | A |
| Example 7 (printed product 7) | A | A | A | A | A |
| Example 8 (printed product 8) | A | A | A | A | A |
| Example 9 (printed product 9) | A | A | A | A | A |
| Comparative Example 1 (printed product 10) | C | B | A | A | A |
| Comparative Example 2 (printed product 11) | A | B | C | B | A |
| Comparative Example 3 (printed product 12) | A | C | B | C | C |
| Comparative Example 4 (printed product 13) | A | A | A | B | B |

TABLE 2

|  | Film tearing test | Surface strength test | Solvent resistance test | Cracking property test | Transparency test |
|---|---|---|---|---|---|
| Example 1 (printed product 1') | A | A | A | A | A |
| Example 2 (printed product 2') | A | A | A | A | A |
| Example 3 (printed product 3') | A | A | A | A | A |
| Example 4 (printed product 4') | A | A | A | A | A |
| Example 5 (printed product 5') | B | B | A | A | A |
| Example 6 (printed product 6') | A | A | A | A | A |
| Example 7 (printed product 7') | A | A | A | A | A |
| Example 8 (printed product 8') | A | A | A | A | A |
| Example 9 (printed product 9') | A | A | A | A | A |
| Comparative Example 1 (printed product 10') | C | B | A | A | A |
| Comparative Example 2 (printed product 11') | A | B | C | B | A |
| Comparative Example 3 (printed product 12') | A | C | B | C | C |
| Comparative Example 4 (printed product 13') | A | A | A | B | B |

DESCRIPTION OF SYMBOLS 1 transfer film
10 substrate
20 protective layer
30 adhesive layer
40 transfer layer
50 release layer
60 primer layer
70 receptive layer

The invention claimed is:

1. A transfer film comprising:
   a substrate; and
   a protective layer peelably provided on the substrate,
   wherein the protective layer comprises an active ray-cured resin and a filler;
   wherein the active ray-cured resin contains a polyfunctional urethane (meth)acrylate as a polymerization component;
   wherein the filler has a volume average particle size of 40 nm or less; and
   wherein a number of functional groups in the polyfunctional urethane (meth)acrylate is 5 or more and 15 or less.

2. The transfer film according to claim 1, further comprising an adhesive layer on the protective layer.

3. The transfer film according to claim 2, wherein the adhesive layer has a function as a receptive layer.

4. The transfer film according to claim 1, further comprising a release layer between the substrate and the protective layer.

5. The transfer film according to claim 1, wherein the active ray-cured resin further contains urethane (meth)acrylate having a functional group number of 2 or more and 4 or less and/or (meth)acrylate having a functional group number of 2 or more and 5 or less as a polymerization component.

6. The transfer film according to claim 2, wherein the adhesive layer comprises silicone.

7. The transfer film according to claim 2, further comprising a release layer between the substrate and the protective layer.

8. The transfer film according to claim 3, further comprising a release layer between the substrate and the protective layer.

9. The transfer film according to claim 2, wherein the number of functional groups in the polyfunctional urethane (meth)acrylate is 5 or more and 15 or less.

10. The transfer film according to claim 3, wherein the number of functional groups in the polyfunctional urethane (meth)acrylate is 5 or more and 15 or less.

11. The transfer film according to claim 2, wherein the active ray-cured resin further contains urethane (meth)acrylate having a functional group number of 2 or more and 4 or less and/or (meth)acrylate having a functional group number of 2 or more and 5 or less as a polymerization component.

12. The transfer film according to claim 3, wherein the active ray-cured resin further contains urethane (meth)acrylate having a functional group number of 2 or more and 4 or less and/or (meth)acrylate having a functional group number of 2 or more and 5 or less as a polymerization component.

13. The transfer film according to claim 3, wherein the adhesive layer comprises silicone.

14. A transfer film comprising:
a substrate; and
a protective layer peelably provided on the substrate,
wherein the protective layer comprises an active ray-cured resin and a filler;
wherein the active ray-cured resin contains a polyfunctional urethane (meth)acrylate as a polymerization component;
wherein the filler has a volume average particle size of 40 nm or less; and
wherein the active ray-cured resin further contains urethane (meth)acrylate having a functional group number of 2 or more and 4 or less and/or (meth)acrylate having a functional group number of 2 or more and 5 or less as a polymerization component.

15. A transfer film comprising:
a substrate;
a protective layer peelably provided on the substrate; and
an adhesive layer having a function of a receptive layer on which an image is formed and defining an uppermost layer of the transfer film;
wherein the protective layer comprises an active ray-cured resin and a filler;
wherein the active ray-cured resin contains a polyfunctional urethane (meth)acrylate as a polymerization component; and
wherein the filler has a volume average particle size of 40 nm or less.

16. A printed product comprising:
a transfer object; and
an adhesive layer and a protective layer transferred on the transfer object from the transfer film according to claim 15.

* * * * *